US011504893B2

(12) United States Patent
Ebdon et al.

(10) Patent No.: US 11,504,893 B2
(45) Date of Patent: Nov. 22, 2022

(54) EXTRUDED POLYACRYLONITRILE COPOLYMER

(71) Applicant: METIS TECHNOLOGIES PTY LTD, Huntingwood (AU)

(72) Inventors: Nicholas Ebdon, Huntingwood (AU); Ilias Louis Kyratzis, Huntingwood (AU); George Maurdev, Huntingwood (AU); Mike O'Shea, Huntingwood (AU); Michael Gerakios, Avoca Beach (AU)

(73) Assignee: METIS TECHNOLOGIES PTY LTD, New South Wales (AU)

( * ) Notice: Subject to any disclaimer, the term of this patent is extended or adjusted under 35 U.S.C. 154(b) by 400 days.

(21) Appl. No.: 16/466,778

(22) PCT Filed: Nov. 30, 2017

(86) PCT No.: PCT/AU2017/000254
§ 371 (c)(1),
(2) Date: Jun. 5, 2019

(87) PCT Pub. No.: WO2018/102848
PCT Pub. Date: Jun. 14, 2018

(65) Prior Publication Data

US 2019/0344490 A1 Nov. 14, 2019

(30) Foreign Application Priority Data

Dec. 5, 2016 (AU) ................................ 2016904999

(51) Int. Cl.

| | |
|---|---|
| ***B29C 48/00*** | (2019.01) |
| ***B29C 48/05*** | (2019.01) |
| ***C08F 220/14*** | (2006.01) |
| ***C08F 220/18*** | (2006.01) |
| ***C08F 220/44*** | (2006.01) |
| ***C08K 5/098*** | (2006.01) |
| ***D01D 5/08*** | (2006.01) |
| ***D01F 1/07*** | (2006.01) |
| ***D01F 6/38*** | (2006.01) |
| ***D06M 11/77*** | (2006.01) |
| ***D06M 13/188*** | (2006.01) |
| ***D06M 13/513*** | (2006.01) |
| ***D06M 15/61*** | (2006.01) |
| *C08K 3/08* | (2006.01) |
| *D06M 101/28* | (2006.01) |

(52) U.S. Cl.
CPC ............ *B29C 48/022* (2019.02); *B29C 48/05* (2019.02); *C08F 220/14* (2013.01); *C08F 220/44* (2013.01); *C08K 5/098* (2013.01); *D01D 5/08* (2013.01); *D01F 1/07* (2013.01); *D01F 6/38* (2013.01); *D06M 11/77* (2013.01); *D06M 13/188* (2013.01); *D06M 13/513* (2013.01); *D06M 15/61* (2013.01); *C08K 2003/0893* (2013.01); *D06M 2101/28* (2013.01); *D06M 2200/30* (2013.01)

(58) Field of Classification Search
CPC ........ C08F 220/42; C08F 220/44; C08K 3/10; C08K 3/11; C08K 3/16; C08K 3/08; C08K 3/105; C08K 3/34; C08K 2003/0893; B29C 48/022; B29C 48/05
See application file for complete search history.

(56) References Cited

U.S. PATENT DOCUMENTS

| | | | |
|---|---|---|---|
| 5,106,925 A | 4/1992 | Curatolo et al. | |
| 5,602,222 A * | 2/1997 | Smierciak | C08F 220/44 526/342 |
| 8,450,407 B2 | 5/2013 | Prusty et al. | |

FOREIGN PATENT DOCUMENTS

| | | |
|---|---|---|
| CN | 102108187 | 6/2011 |
| CN | 103806118 | 5/2014 |
| CN | 104945868 | 9/2015 |
| CN | 105040150 | 11/2015 |
| DE | 2658907 | 7/1978 |
| DE | 2713476 | 9/1978 |
| DE | 69633817 | 11/2005 |
| EP | 0783048 | 11/2004 |
| JP | S49-034547 | 3/1974 |
| JP | S53-082894 | 7/1978 |
| JP | H02-145814 | 6/1990 |
| JP | H04-254460 | 9/1992 |
| JP | H04-261437 | 9/1992 |
| JP | H05-271352 | 10/1993 |
| JP | 9-512587 | 12/1997 |
| JP | 2014-167038 | 9/2014 |
| RU | 2541527 | 10/2010 |
| WO | WO 1992/019799 | 11/1992 |
| WO | WO 2017/139831 | 8/2017 |

OTHER PUBLICATIONS

Ren, Yuanlin et al. Journal of Sol-Gel Science and Technology vol. 82 pp. 280-288 (published online Dec. 1, 2016) (Year: 2016).*
English translation of Office Action issued in Japanese Patent Application No. 2019-531113, dated Oct. 11, 2021.
English translation of Office Communication issued in Russian Patent Application No. 2019120276, dated Mar. 19, 2021.
PCT International Notification of Transmittal of International Preliminary Report on Patentability (Chapter II of the Patent Cooperation Treaty) issued in International Application No. PCT/AU2017/000254, dated Mar. 19, 2019.
PCT International Search Report and Written Opinion issued in International Application No. PCT/AU2017/000254, dated Jan. 17, 2018.
Yan et al., "Preparation, flame retardancy and thermal degradation behaviors of polyacrylonitrile fibers modified with diethylenetriamine and zinc ions," *Journal of Thermal Analysis and Calorimetry*, 124:719-728, 2016.

(Continued)

*Primary Examiner* — Irina S Zemel
*Assistant Examiner* — Jeffrey S Lenihan
(74) *Attorney, Agent, or Firm* — Parker Highlander PLLC

(57) ABSTRACT

The invention relates to a polymeric fibre derived from a copolymer of polyacrylonitrile and a comonomer. The fibre comprises a metal ion and/or silicon at from about 1 to about 15 wt %. A process for making the fibre is also described.

17 Claims, 1 Drawing Sheet

(56) References Cited

OTHER PUBLICATIONS

English summary of Office Communication issued in Chinese Patent Application No. 201780085195.6, dated Mar. 3, 2021.
Manual of Flame Retardant Plastics, edited by Ou Yuxiang, National Defence Industry Press, p. 22, Version 1 (1st Shot) of Jan. 2008, Jan. 31, 2008.
Notice of Allowance issued in Japanese Application No. 2019-531113, dated Feb. 7, 2022.

* cited by examiner

EXTRUDED POLYACRYLONITRILE COPOLYMER

This application is a national phase application under 35 U.S.C. § 371 of International Application No. PCT/AU2017/000254, filed Nov. 30, 2017, which claims the benefit of Australian Patent Application No. 2016904999, filed Dec. 5, 2016, the entirety of each of which is incorporated herein by reference.

FIELD

The invention relates to an extruded fibre derived from a polyacrylonitrile copolymer and to a process for making it.

BACKGROUND

Polyacrylonitrile (PAN) is a synthetic, semicrystalline linear organic polymer, with the formula $(C_3H_3N)_n$. Although it is thermoplastic, it does not melt under normal conditions but rather degrades before melting. It melts above 300° C. if the heating rates are 50° C. per minute or above. Almost all polyacrylonitrile resins are copolymers made from mixtures of monomers with acrylonitrile as the main component.

Polyacrylonitrile resins have been used to produce large variety of products including ultra-filtration membranes, hollow fibres for reverse osmosis, fibres for textiles, and oxidized PAN fibres. PAN fibres are also used as the chemical precursor of high-quality carbon fibre.

Polyacrylonitrile (PAN) and PAN copolymers generally have very poor flame retardant properties. Comonomers are frequently halogenated. The polymers and copolymers commonly contain flame retardants in order to overcome this disadvantage, however these can produce toxic off-gases in fire situations which represent a significant hazard.

A number of approaches are available to improve the flame resistance properties of polymeric materials. For PAN and its derivatives a multistep synthetic process has been developed and is used commercially today. One of these involves the treatment of PAN with hydrazine hydrate. It is not understood what chemical transformation occurs that provides the flame retardant properties of hydrazine-treated PAN, as the chemistry of the initial reaction between PAN and hydrazine hydrate is extremely complex.

In recent years, with the aim to reduce handling and use of toxic chemicals, some common flame retardant chemicals have been banned, or are being phased out and have limited use to a few countries. Halogenated polymers or chemicals used to achieve flame retardant properties have been found to accumulate in the environment, and therefore pose a health hazard and are being phased out. Hydrazine hydrate is corrosive, irritant, biologically (carcinogen, skin corrosion and sensitisation) and environmentally toxic (aquatic), is a strong reducing agent and in its anhydrous form extremely explosive. Due to it hazardous nature, its use requires stringent safety controls.

An alternative to the hydrazine process which avoids many of its problems is described in Australian Provisional Patent Application No. 2016900596 and related International Application No. PCT/AU2017/000046, the entire contents of both of which are incorporated herein by reference. This process used organic diamines, which also require careful handling and may be toxic. Additionally, it relied on post-treatment of an existing fibre rather than generating a fibre with the desired properties initially.

Polyacrylonitrile fibres are predominately produced by a wet-spinning process. This is a costly, hazardous and difficult process, requiring specialised equipment and solvent handling capability It is therefore desirable to develop a process for making a flame-retardant PAN-based fibre that overcomes at least some of the above disadvantages.

SUMMARY OF INVENTION

In a first aspect of the invention there is provided a polymeric fibre derived from a copolymer of polyacrylonitrile and a comonomer, said fibre comprising a metal ion and/or silicon at from about 1 to about 15 wt %.

The following options may be used in conjunction with the first aspect, either individually or in any suitable combination.

The copolymer may comprise from about 10 to about 30 mol % of the comonomer. It may be an acrylic or methacrylic comonomer. It may be halogen-free.

The metal ion may be a Group 3 to 16 metal ion, for example zinc (II).

The copolymer may be a random copolymer. It may have a weight average molecular weight between about 10 and about 100 kDa. It may have a bimodal molecular weight distribution.

The polymeric fibre may have no detectable crystallinity. It may have reduced crystallinity relative to pure PAN. This may be as measured using x-ray scattering or diffraction. The polymeric fibre may be crosslinked, for example by means of the metal ion and/or silicon.

The polymeric fibre may have a limiting oxygen index (LOI) of at least 40 as measured using ASTM D2863-13. It may be such that it does not sustain combustion.

In one embodiment there is provided a polymeric fibre derived from a copolymer of polyacrylonitrile and a halogen free comonomer, said fibre comprising zinc (II) ions at from about 1 to about 15 wt %.

In another embodiment there is provided a polymeric fibre derived from a copolymer of polyacrylonitrile and a halogen free comonomer, said fibre comprising silicon at from about 1 to about 15 wt %.

In a second aspect of the invention there is provided a process for making a polymeric fibre, said process comprising: preparing a copolymer melt comprising (i) a copolymer of polyacrylonitrile and a comonomer, and (ii) either a metal ion additive and/or silicon containing additive at from about 1 to about 15 wt %; and extruding the copolymer melt through a dye to form said fibre.

The following options may be used in conjunction with the second aspect, either individually or in any suitable combination.

The step of preparing the copolymer melt may comprise melting the copolymer to a temperature above its melting point, adding the additive and dispersing said additive in the molten copolymer. The agitating may be performed by means of a screw extruder.

The additive may be a metal ion additive. The additive may be a salt of said metal ion. Alternatively, the additive may be a silicon containing additive. In this case the additive may be an alkoxysilane comprising a functional alkyl group attached to silicon. The functional alkyl group may comprise a radically polymerisable group and the process may therefore comprise adding a thermal initiator to the copolymer prior to adding the additive.

In one embodiment there is provided a process for making a polymeric fibre, said process comprising: preparing a copolymer melt comprising (i) a copolymer of polyacrylonitrile and a comonomer, and (ii) a salt of a metal ion at from about 1 to about 15 wt %; and extruding the copolymer melt through a dye to form said fibre.

In another embodiment there is provided a process for making a polymeric fibre, said process comprising: preparing a copolymer melt comprising (i) a copolymer of polyacrylonitrile and a comonomer, adding to the melt a thermal initiator, and subsequently adding an alkoxysilane comprising a radically polymerisable functional alkyl group attached to silicon; and extruding the copolymer melt through a dye to form said fibre.

In a third aspect of the invention there is provided a process for making a polymeric fibre, said process comprising preparing a copolymer melt comprising a copolymer of polyacrylonitrile and a comonomer; extruding the copolymer melt through a dye to form a precursor fibre; and treating the precursor fibre with a metal ion additive and/or a silicon containing additive so as to form the polymeric fibre.

The step of treating may comprise exposing the precursor fibre to a solution of the additive for sufficient time to incorporate from about 1 to about 15 wt % of either the metal ion or silicon or both into the fibre.

In a fourth aspect of the invention there is provided use of a fibre according to the first aspect, or a fibre made by the process of the second or third aspect, for the manufacture of a flame resistant or flame retardant fabric.

In a fifth aspect of the invention there is provided use of a fibre according to the first aspect, or a fibre made by the process of the second or third aspect, for the manufacture of an antimicrobial fabric.

The fibre of the first aspect may be made by the process of either the second or the third aspect. The processes of the second and third aspects may be suitable for, or may be used to, make a fibre according to the first aspect.

DESCRIPTION OF EMBODIMENTS

Figure 1:
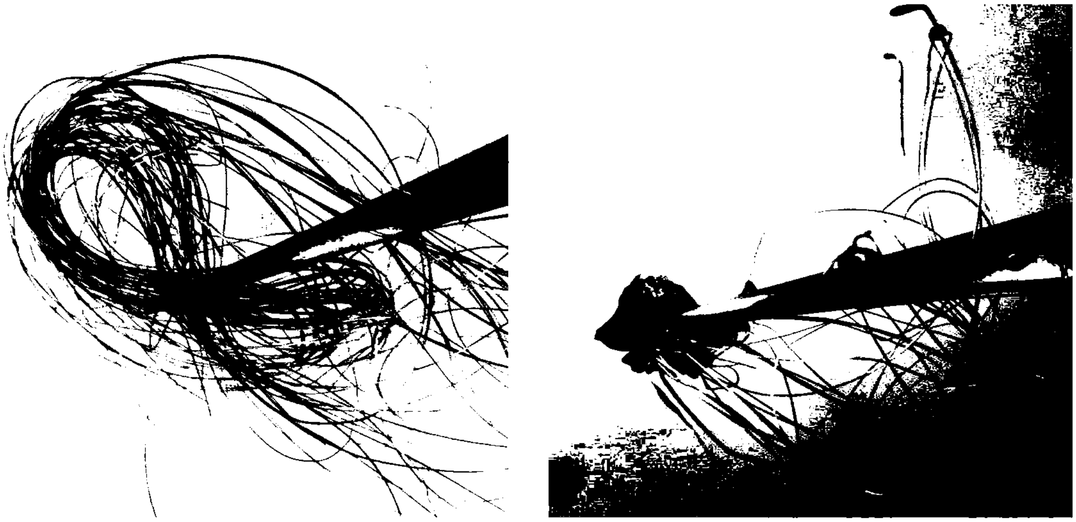
FIG. 1 shows a sample of conventional PAN fibre, before (left) and after (right) exposure to a flame.

The invention relates to fibres derived from PAN copolymers. The precise structure of these polymers is not fully understood, however it is thought that various cyclic nitrogen containing structures may be formed at the melt temperature from the nitrile side groups, optionally in conjunction with functional groups on the copolymer. The reaction of the nitrile groups may also lead to a certain degree of crosslinking. In the present disclosure, the term "derived from" a designated species indicates that the designated species has been reacted, treated or modified in some way to obtain the resulting material. Thus reference to fibres derived from PAN copolymers indicates that the PAN copolymers are modified in some fashion in order to obtain the fibres. This may involve one or more chemical and/or physical transformations.

The starting copolymers may comprise about 70 to about 90% (or about 70 to 80, 80 to 90, 75 to 85 or 75 to 80, e.g. about 70, 75, 80, 85 or 90%) acrylonitrile monomer units and about 10 to about 30% (or about 10 to 20, 20 to 30, 15 to 25, 15 to 20 or 20 to 25%, e.g. about 10, 15, 20, 25 or 30) comonomer units on a molar basis. The comonomer in this context may be a mixture of different comonomers. Each, independently, may be an acrylic or methacrylic monomer, whereby if more than one comonomer is present, the sum of the comonomers is about 10 to about 30% on a molar basis. Suitable comonomers include (meth)acrylic acid, alkyl (meth)acrylates (for example methyl, ethyl, phenyl, hydroxyethyl), (meth)acrylamides (either N-unsubstituted, N-monosubstituted or N,N-disubstituted, each substituent, if present, being for example an alkyl group or an aryl group). Particular examples of suitable comonomers are set out below:

Acrylates—C1 to C12 alkyl, aryl and cyclic acrylates such as methyl acrylate, ethyl acrylate, phenyl acrylate, isobonyl acrylate.

Methacrylates—C1 to C12 alkyl, aryl and cyclic methacrylates such as methyl methacrylate, ethyl methacrylate, phenyl methacrylate butyl methacrylate 2-ethyl hexyl methacrylate and isobonyl methacrylate.

Methacrylonitrile

The copolymers may be random copolymers or may be alternating copolymers. Preferably they are not block copolymers.

In preferred embodiments the comonomer is halogen free. Indeed it is preferable that the fibre of the invention is entirely halogen free. In this context, "halogen free" refers to a halogen content of less than about 100 ppm by weight, or of less than about 50, 20, 10, 5, 2 or 1 ppm by weight.

Suitable methods for making the copolymers are well known to those skilled in the art. The copolymers may be made by emulsion polymerisation, suspension polymerisation, solution polymerisation or bulk polymerisation. They will commonly be polymerised using a radical process, although anionic polymerisation may at times be used. In order to achieve a suitable random or alternating monomer sequence, a comonomer with suitable reactivity ratio may be selected. Alternatively (or additionally) suitable monomer feed regimes, e.g. starved feed, may be used to affect the comonomer arrangement. These are all well known in the art.

The acrylonitrile copolymer may have Mw of between about 10 and about 100 kD, or about 10 and 50, 10 and 20, 20 and 100, 50 and 100 or 30 and 70 kD, e.g. about 10, 15, 20, 25, 30, 35, 40, 45, 50, 60, 70, 80, 90 or 100 kD. It may have a narrow molecular weight distribution or may have a broad molecular weight distribution. It may have Mw/Mn of less than about 2, or less than about 1.5, 1.4, 1.3, 1.2 or 1.1, or greater than about 1.3, or greater than about 1.4, 1.5, 1.6, 1.7, 1.8, 1.9 or 2. It may have Mw/Mn of about 1.05, 1.1, 1.2, 1.3, 1.4, 1.5, 1.6, 1.7, 1.8, 1.9 or 2, or greater than about 2. In general, the copolymer should not have a molecular weight of greater than about 100 kD so as above that the viscosity renders extrusion more difficult. Control of the molecular weight of the copolymer may be achieved by use of a suitable chain transfer agent, for example a thiol.

In some instances the copolymer may have a bimodal molecular weight distribution. In this context, the term "bimodal" refers to a distribution in which a local minimum exists between two maxima in the GPC trace of the polymer. This does not necessarily require a clear separation of the two molecular weight populations. A bimodal distribution may be achieved for example by blending two monomodally distributed copolymers. A bimodal distribution may serve to improve the rheology of the molten copolymer so as to facilitate extrusion.

The fibre of the invention also contains either a metal ion or silicon or both. The metal ion may be a Group 3 to Group 16 metal. It may be a Group 10 to Group 12 metal. It may be a Group 10 metal or a Group 11 metal or a Group 12 metal. It may be for example any one of Fe, Co, Ni, Cu, Zn, Ru, Rh, Pd, Ag or Cd. It may be a Group 13 or a Group 14 metal, e.g. Al, Ga, In, Sn or Pb. Mixtures of suitable metals may also be used. The metal may be in its +2 or +3 ionic form or in some other valency form. In some embodiments the metal ion is a divalent metal salt, e.g. zinc (II). The metal ion may be complexed or it may be uncomplexed. Mixtures of metal ions may be used. Any suitable counterion may be used, e.g. acetate, propionate, nitrate, sulfate etc. Preferably the counterion is not a halogen.

The silicon may be present as a comonomer group, or may be derived from a comonomer. It may be a vinyl functional silane, e.g. a vinyl functional alkoxysilane. The vinyl group may be directly attached to the silicon or it may be separated by a spacer. Suitable silanes therefore include vinyl alkoxysilanes, allyl alkoxysilanes, (meth)acryloyloxyalkylalkoxysilanes etc. The silanes may be monalkoxysilanes, dialkoxysilanes or trialkoxysilanes. Suitable alkoxysilanes include methacryloyloxypropyltrimethoxysilane and methacryloyloxypropyltriethoxysilane. Alternatively, or additionally, other functional silanes such as aminoalkylsilanes may be used. Again, these may be monalkoxysilanes, dialkoxysilanes or trialkoxysilanes. Suitable silanes include aminopropyltrimethoxysilane, N-(2-aminoethyl)-2-aminoethyltrimethoxysilane, aminopropyltriethoxysilane and N-(2-aminoethyl)-2-aminoethyltriethoxysilane. Other functional alkylalkoxysilanes may also be used, for example glycidoxyalkyl alkoxysilanes.

The additive (metal ion and/or silicon) may be present (each individually or in combination) at a level of from about 1 to about 15% on a weight basis, or about 1 to 10, 1 to 5, 1 to 2, 1 to 15, 2 to 10, 5 to 10, 5 to 15, 2 to 5, 5 to 8 or 3 to 7%, e.g. about 1, 2, 3, 4, 5, 6, 7, 8, 9, 10, 11, 12, 13, 14 or 15%. In some instances even higher levels of metal or silicon may be present. These levels may be independently for metal ion and silicon, or may be for a combination of the two.

It is thought that the presence of the metal or silicon may enhance the flame resistance or flame retardancy of the fibre. It may additionally or alternatively enhance the antimicrobial activity of the fibre.

The fibres of the present invention may be essentially non-crystalline. This may be a consequence of the disruption of the crystal structure of PAN by the comonomers present in the copolymer. In some embodiments there is no detectable crystallinity. A suitable way to assess this is by x-ray scattering/diffraction. Thus the fibres may in some instances have no detectable crystallinity as measured using x-ray scattering/diffraction. In its pure form, PAN has discrete crystalline domains mixed in between smaller amorphous domains. Increasing the co-monomer concentration increases the size of the amorphous regions. The use of a randomly distributed comonomer limits long acrylonitrile monomer sequences, thereby decreasing the size of the crystalline domains. Therefore the presence of the comonomer disrupts the crystallinity, and also reduces the crystallinity.

The fibres may be cross-linked. The cross-linking may be by way of the metal ion, which may cross-link by coordination and/or ionic bonding with adjacent polymer chains. It may be by way of the silicon, which may have cross-linking reactive groups (vinyl, glycidoxy, amino) which may react during the extrusion process to link with nitrile derived structures in the polymer so as to cross-link it. The precise structures of such cross-links are not fully understood. However the presence of cross-linking may be inferred by a lack of melting, lack of solubility and other such measures. In some embodiments separate cross-linking groups are introduced into the copolymer. These may for example include divinyl compounds, as discussed below in respect of the methods for making the fibres.

The fibres of the invention may be produced without the use of a diamine. In particular they may be produced without the use of hydrazine or a derivative thereof, and/or without the use of an organic diamine or derivative thereof. The fibres may contain no moieties derived from an organic diamine or from hydrazine or from a derivative of either of these. However in some embodiments, such diamines may be used, and therefore diamine-derived moieties may be present in the fibrese. As noted elsewhere, these may be introduced only after fibre extrusion.

The fibres may additionally comprise any one or more common additives, including pigments/colourants, fillers, plasticisers, lubricants, additional fire retardant materials etc. Such materials are well known in the art, as are suitable levels for use. For example:

pigments: these are commonly either mineral oxide based or organic pigments, although others are known in the art. They are commonly added at between about 0.1 and 1% by weight, although depending on the nature of the pigment and the desired colour density, other concentrations may be appropriate.

Plasticisers: these are commonly liquids compatible with the copolymer. The range of suitable liquids may vary depending on the nature and proportion of comonomer. Useful plasticisers include propylene carbonate, ethylene carbonate, butylene carbonate and phthalate plasticisers. They are commonly used in proportions up to about 40% by weight (or up to 30, 20 or 10%) of the copolymer, depending on the degree of plasticisation required.

Lubricants: these include surfactants, e.g. polyether based surfactants, and may be used in proportions up to about 2-3% by weight of copolymer.

Stabilisers: these are described elsewhere herein and may be present in an amount of about 0.1 to about 1% of the copolymer.

Fire retardant materials: these are commonly used in proportions of up to about 2-3% by weight, but will depend on the degree of additional fire retardancy required. Preferably the fire retardant materials are non-halogenated. They may include minerals such as aluminium hydroxide, magnesium hydroxide etc. and organophosphorus additives such as triphenylphosphate. In many instances, however, added fire retardants are not necessary and are not used.

The fibres of the invention may be flame retardant or flame resistant. They may have a limiting oxygen index (LOI) greater than that of acrylonitrile. This feature may be used to define a polymer as being “flame resistant and/or flame retardant”. It may have LOI at least 1% greater than that of acrylonitrile, or at least 2, 3, 4 or 5% greater (where for example LOI of 40% is taken to be 5% higher than LOI of 35%). It may have LOI of at least 40%, or at least 41, 42, 43, 44 or 45%. In some applications lower LOI may be acceptable, e.g. about 30 to about 40%, or about 30 to 35, 35 to 40 or 38 to 40, e.g. about 30, 32, 24, 26, 38 or 40%. LOI refers to the minimum concentration (V/V) of oxygen in an oxygen enriched atmosphere in which the material will sustain combustion or a source of ignition. It may be tested according to ASTM D 2863-13 or ISO 4589-3:1996. The fibres may therefore be incombustible in ambient air. They may be incapable of supporting combustion in ambient air.

The fibres have also, surprisingly, been found to have antimicrobial properties. Thus garments comprising these fibres have been found to suppress development of unpleasant bodily odours. When applied to a wound, they may suppress infection. They may not support growth of fungi thereon. They may be anti-fungal.

The fibres of the invention may be made by melt extrusion. This may be conducted at a temperature of about 150 to about 200° C. or about 150 to 190, 150 to 180, 150 to 170, 170 to 200, 180 to 200, 190 to 200, 160 to 190, 170 to 190 or 160 to 180° C., e.g. about 150, 155, 160, 165, 170, 175, 180, 185, 190, 195 or 200° C. or at some other suitable temperature. The extrusion may be conducted through a single temperature zone or through multiple (e.g. 2, 3, 4, 5, 6, 7, 8, 9 or 10) temperature zones. In the latter instance, each zone independently may be within the ranges described above. The zones may be in order of increasing temperature, or in order of decreasing temperature, or may be in some other order. Thus the copolymer may be melted and the required additive (metal ion and/or silicon) added to the melt, or the copolymer may be mixed with the required additive and the resulting mixture melted. The additive may be added at a level of from about 1 to about 15% on a weight basis, or about 1 to 10, 1 to 5, 1 to 2, 1 to 15, 2 to 10, 5 to 10, 5 to 15, 2 to 5, 5 to 8 or 3 to 7%, e.g. about 1, 2, 3, 4, 5, 6, 7, 8, 9, 10, 11, 12, 13, 14 or 15%, or at a level so as to achieve these levels in the final product. Suitable forms of these additives for use in the process have been discussed above.

During the melt extrusion, the copolymer may be combined, or may be in combination with, a diluent. The diluent may be for example a diol or a triol, for example ethylene glycol or glycerol. This may be present in an amount of between about 10 and about 40% by weight of the total mixture, or about 10 to 30, 10 to 20, 20 to 40, 30 to 40 or 20 to 30%, e.g. about 10, 15, 20, 25, 30, 35 or 40%. One or more stabilisers may also be present. These may be for example free radical scavengers, peroxide scavengers or antioxidants. A mixture of two or all of these types may be used. A suitable stabiliser is Irganox® HP2225. The stabiliser (either in combination or each individually) may be present in an amount of about 0.1 to about 1% by weight in the extruded mixture, or about 0.1 to 0.5, 0.1 to 0.2, 0.2 to 1, 0.5 to 1 or 0.2 to 0.5%, e.g. about 0.1, 0.2, 0.3, 0.4, 0.5, 0.6, 0.7, 0.8, 0.9 or 1%. It will be recognised that the resultant fibre may have these stabilisers in the abovereferenced proportions as a result.

The extrusion may be conducted under an inert atmosphere or under a reducing atmosphere or under some other atmosphere e.g. air. The atmosphere may be for example argon, nitrogen, carbon dioxide or some other atmosphere, or under a combination of any two or more of the abovementioned atmosphere. It may be conducted in the absence of oxygen. This may serve to prevent or inhibit oxidative damage during extrusion.

Other additives (colourants, etc.) may be added in similar fashion. Commonly if a plasticiser is added, it will be mixed with the copolymer before melting so as to facilitate the melting. The molten polymer may be passed down a screw extruder, commonly a twin screw extruder, so as to mix the components to a homogeneous mix. In some instances, the polymer may be fed as a solid to the extruder together with the various additives (or the additives may be added at various locations down the extruder) and melted in the extruder. It will therefore be understood that at least part of the extruder is heated to at least the melting point of the copolymer (or of the mixture of copolymer with at least the plasticiser).

The extruder may be coupled to a die so as to extrude one or more filaments or fibres of the copolymer. This may be done under some tension in order to control orientation of polymer chains within the fibre and/or to control the diameter of the fibre. The dye may have holes that are circular so that the filament or fibre will have a circular cross-section, or may have holes of some different shape, e.g. square, triangular, pentagonal etc. so as to impart the corresponding cross-sectional shape to the fibre.

In some instances the mix fed to the die comprises a vinyl functional crosslinker. Suitable such crosslinkers include silanes, e.g. alkoxysilanes or silanes, comprising at least two polymerisable vinyl groups (e.g. methacryloyloxypropyl, allyl etc.), divinylbenzene, di(meth)acrylates (e.g. ethylene glycol di(meth)acrylate), and others known to those skilled in the art. In this instance it may be beneficial to add a free-radical initiator in order to promote cross-linking. This may be done before addition of the cross-linker to the molten mixture. In this way, thermal decomposition of the initator to generate radicals can commence before the addition of the cross-linker so that the cross-linking reaction can commence once the cross-linker is added.

It is important to ensure that only a limited degree of cross-linking occurs before the molten mixture is extruded through the die. This may be accomplished by suitable adjustment of the concentration and nature of the initiator, concentration and nature of the cross-linker, temperature and addition points of the initiator and cross-linker. Thus for example, an initiator having a higher 10 hour half life will result in a lower cross-linking level prior to extrusion through the dye. A suitable initiator is hydrogen peroxide, however other peroxides such as cumyl hydroperoxide, benzoyl peroxide etc. may be used.

Other ways to cross-link the fibres include use of polyunsaturated monomers e.g. pentaerythritol triacrylate, protected or unprotected melamines (e.g. Cymel® 303), bisoxazolines, bis-carbamates, polyisocyanates, triallyl isocyanurates, polyisocyanates or epoxides etc. In some of these examples, on demand crosslinking mechanisms may be used. Thus for example for UV initiated crosslinking, it may be necessary to add a UV absorber to the polymer melt. This could then be activated after extrusion by exposure of the extruded fibre or filament to UV radiation of a suitable wavelength to activate the UV absorber.

The low initial level of cross-linking allows the molten copolymer mix to remain sufficiently mobile to extrude. It is thought that following extrusion, the cross-linking reaction continues so as to increase the cross-link level in the final fibre. In order to facilitate this, the fibre may be annealed following extrusion. The annealing may be at a suitable temperature that does not cause decomposition. Melting is unlikely due to the cross-linking of the copolymer. Suitable temperatures are from about 100 to about 250° C., or about 100 to 200, 100 to 150, 150 to 250, 200 to 250 or 150 to 200° C., e.g. about 100, 150, 200 or 250° C.

In an alternative, but related, process for making the fibres, the above process is conducted as described, but without the initial addition of the metal ion or silicon. These may then be incorporated in the fibres in a subsequent post-extrusion step by exposing the fibre to a solution of the metal ion and/or silicon. The exposing may be conducted in a batchwise fashion or may be conducted continuously by passing the extruded fibre through a bath containing the metal ion or silicon. It should be understood in this specification that reference to silicon does not necessarily require elemental silicon, but may, and commonly does, refer to a silicon containing compound, as described elsewhere herein. Where reference is made to the proportion of silicon in a fibre or polymer or other material, this will refer to the proportion of actual silicon, rather than to a compound thereof. Thus for example, the proportion of silicon in silica will be 28/(28+16+16)=47%. The process may be conducted in-line rather than as a discrete process step. Thus the fibre may be extruded directly (or after cooling to solidify it) into the treatment bath.

The bath may comprise the metal ion and/or silicon in solution. Suitable metal ion and silicon compounds have been discussed earlier. The solution may be an aqueous solution or it may be an organic solution or it may comprise a mixture (preferably a miscible mixture) of water and an organic solvent. Suitable organic solvents include alcohols (methanol, ethanol, isopropanol etc.), dipolar aprotic solvents (DMSO, DMF, ethylene carbonate, HMPT, HMPA etc.). The bath may be at ambient temperature or may be at moderately elevated temperature. It may be any suitable temperature up to the boiling point of the solvent. The concentration of the metal ion and/or silicon in the solution, and the residence time in the solution, may be such that the desired level of additive in the fibre is achieved.

The post-extrusion treatment step may be as described in detail in Australian Provisional Patent Application No. 2016900596. Thus the post-extrusion treatment step may comprise reacting the fibre with an organic diamine, optionally treating the fibre with base (e.g. aqueous hydroxide) and subsequently with an acid, and then treating the fibre with a salt of the metal. The organic diamine may have structure $H_2N—R—NH_2$. In this structure, R may be selected from the group consisting of C1-C12 straight chain or branched alkyl groups, polyether groups, polyamine groups, di-, tri- or tetra-alkylsilane groups, dendrimers, trialkylamino groups, aromatic groups and heteroaromatic groups. R may be a dye group. It may be a flame retardant group. The organic diamine may be in aqueous solution.

In the event that the fibre was extruded with the metal ion already present, the post-treatment with organic diamine may nevertheless be conducted as described above.

The invention relates to extrudable PAN copolymers. Various additives may be incorporated into these copolymers, including fillers, pigments, dyes and additives to enhance fire performance, fibre or film performance, tubing quality, look, feel etc. One of more of these additives may be designed so that in a post-extrusion crosslinking step it can crosslink with the copolymer to decrease the load of volatile flammable material. Additionally additives may be surface active in that they may concentrate at the extrudate surface to enhance processing/spinning/orientation or even to enhance flame retardancy or aesthetic properties.

The melt extrusion treatment of the PA copolymers can be undertaken during extrusion or either in-line directly following the melt extrusion processes or off-line as a separate processing step.

Melt spinning of PAN allows reductions in cost by negating the need for large amounts of solvent and the consequent need for solvent recovery in the wet spinning process. There is also the opportunity of blending pigments and reactive grafting of cross linking agents/additional functional groups, thereby cutting the number of steps in post-treatment.

The melting temperature of pure PAN is similar to, or higher than its degradation temperature making it unsuitable for melt extrusion. The disruption of the strong intra- and inter-chain N—N interactions by the incorporation of co-monomers or processing with a plasticiser has been shown to depress the melting point sufficiently to enable melt processing of drawn fibres.

The fibres of the invention show the following advantages:

Flammability Advantage: Char without melting;

Thermal Stability: upon heating need to have no or little shrinkage for both staple and yarn;

Melt Extruder Fibres: are suitable for processes such as texturising;

Orienting fibre: the melt extrusion process can produce drawn fibres in the form of partially oriented yarn;

Reduced fumes: the fibres of the invention emit less fumes upon exposure to a flame source compared to conventional PAN. The Fire Resistant PAN material of the present invention does not melt upon exposure to flame source compared to conventional PAN;

Colourability: the fibres of the invention can be coloured or dyed easily. In particular, introducing dyes and/or pigments during fibre production obviates the need for a separate dyeing step;

Conductivity: the fibres of the invention can be made conductive by addition of a conducting component during production.

Uses for the polymers of the invention include:

Fibres for thermal resistance/fire retardancy

Staple fibres for filter bags for power stations and other industrial exhaust systems as high temperature pollution control exhaust filtration Continuous fibres for knitting, weaving into textiles or use as roving for composites Polymer Film or board or hollow fibres/tubing with enhanced thermal properties Building products—insulation use in exterior/interior/specialty zones Fire Resistant fibre in composite or laminated materials.

EXAMPLES

Reagents

Solvent: DMF 100 mL

Monomer: Acrylonitrile (AN) (53.06 g/mol) 640 mmol=33.96 g

Comonomer Methyl acrylate (MA) (86.09 g/mol) 113 mmol=9.73 g

Initiator AIBN (164.21 g/mol) 3.75 mmol 616 mg

Chain transfer agent 1-dodecane thiol (202.40 g/mol) 0.375 mmol=76 mg

Representative Polymer Synthesis

A monomer solution of 200 mL DMF as solvent, 34 g (640 mmol) AN, 9.73 g (113 mmol) MA was stirred over resin for 30 minutes in order to remove inhibitor and then filtered. Polymerization was performed in a 500 mL 3-neck flask fitted with a condenser, glass stirrer, nitrogen inlet tube, and a reflux tube attached to minimise solvent loss. The solution was purged with dry nitrogen for 15 min. The flask was then lowered into an oil bath at 65° C. for 6 hr. The copolymer was purified by precipitation from 50-fold excess of de-ionized water. The precipitated polymer was filtered, washed with water and then methanol and dried under vacuum at 70° C. for 24 hr.

Extrusion Procedures

A copolymer of AN/MA [85/15, 90/10 mol] molecular weight of [40,000-90,000] with the incorporation of glycerol [20-40% wt] and/or ethylene glycol [10-40% wt] (combined <50% wt) and a suitable stabilizer e.g. Irganox HP 2225 [0.1-1% wt] was fed into a 16 mm twin screw extruder with single hole die or a multifilament spin pack. Heating zones 160, 170, 190, 190° C. The extruded filament was partially elongated/orientated with a take-up winder.

Copolymer of AN/MA [80/20, 70/30 mol] molecular weight of [50,000-120,000] and a suitable stabilizer e.g. Irganox HP 2225 [0.1-1% wt] was fed into a 16 mm twin screw extruder with single hole die or a multifilament spin pack, Heating zones 140, 165, 165, 170° C. The extruded filament was partially elongated/orientated with a take-up winder.

Figure 2:
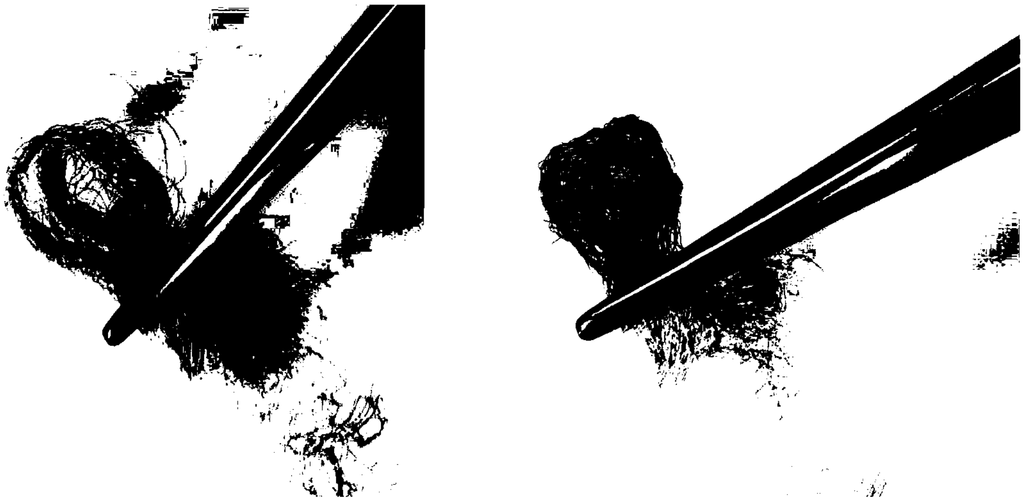
FIG. 2 shows a sample of PAN fibre according to the present invention, before (left) and after (right) exposure to a flame.

Following extrusion, the fibres were treated with zinc and polyamine according to the method of Australian Provisional Patent Application No. 2016900596. The resulting fibres were flame retardant. FIG. 1 shows a conventional PAN fibre before and after exposure to a flame, indicating that it readily supports combustion. By comparison, the fibre of the present invention, prepared as discussed above, chars but does not burn (FIG. 2).

In another example, a copolymer of AN/MA [75/25 mol/mol; Mw about 55,000], a stabilizer Irganox® HP 2225 [42.5% tris(2,4-di-tert-butylphenyl) phosphite, 42.5% tetrakis[methylene(3,5-di-tert-butylhydroxyhydrocinnamate)] methane, and 15% 5,7-di-t-butyl-3-(3,4 di-methylphenyl)-3H-benzofuran-2-one; 0.5% wt], zinc acetate [7% wt] and tetra(trimethoxysilyl)ethylenediamine [1% wt] were fed into a 13 mm twin screw extruder with single hole die, with heating zones 140, 165, 165, 170 and 180° C. The extruded filament was partially elongated/orientated with a take-up winder.

The invention claimed is:

1. A polymeric fibre derived from a copolymer of acrylonitrile and a comonomer, said fibre comprising a metal ion and silicon at from about 1 to about 15 wt % and said fibre having no detectable crystallinity as measured using x-ray scattering, wherein the copolymer comprises from about 10 to about 30 mol % of the comonomer, the comonomer is an acrylic or methacrylic comonomer, and the copolymer has a weight average molecular weight between about 10 kDa and about 100 kDa.

2. The polymeric fibre of claim 1 wherein the comonomer is halogen-free.

3. The polymeric fibre of claim 1 wherein the metal ion is a Group 3 to 16 metal ion.

4. The polymeric fibre of claim 3 wherein the metal ion is zinc (II).

5. The polymeric fibre of claim 1 wherein the copolymer is a random copolymer.

6. The polymeric fibre of claim 1 wherein the copolymer has a bimodal molecular weight distribution.

7. The polymeric fibre of claim 1 which comprises a filler.

8. The polymeric fibre of claim 1 which is crosslinked.

9. The polymeric fibre of claim 8 which is crosslinked by means of the metal ion and/or silicon.

10. The polymeric fibre of claim 1 having a limiting oxygen index (LOI) of at least 40 as measured using ASTM D2863-13.

11. The polymeric fibre of claim 1 which does not sustain combustion in ambient air.

12. A process for making a polymeric fibre according to claim 1, said process comprising:

Preparing a copolymer melt comprising (i) a copolymer of acrylonitrile and a comonomer, and (ii) a metal ion additive and a silicon containing additive at from about 1 to about 15 wt %; and Extruding the copolymer melt through a dye to form said fibre;

wherein the copolymer comprises from about 10 to about 30 mol % of the comonomer, the comonomer is an acrylic or methacrylic comonomer, and the copolymer has a weight average molecular weight between about 10 kDa and about 100 kDa.

13. The process of claim 12 wherein the step of preparing the copolymer melt comprises melting the copolymer to a temperature above its melting point, adding the metal ion additive and/or silicon containing additive, and dispersing said metal ion additive and/or silicon containing additive in the molten copolymer.

14. The process of claim 12 wherein the metal ion additive is a salt of said metal ion.

15. The process of claim 12 wherein the silicon containing additive is an alkoxysilane comprising a functional alkyl group attached to silicon.

16. The process of claim 15 wherein the functional alkyl group comprises a radically polymerisable group and the process comprises adding a thermal initiator to the copolymer prior to adding the additive.

17. A process for making a polymeric fibre according to claim 1, said process comprising:

preparing a copolymer melt comprising a copolymer of acrylonitrile and a comonomer;

extruding the copolymer melt through a dye to form a precursor fibre; and treating the precursor fibre with a metal ion additive and a silicon containing additive so as to form the polymeric fibre;

wherein the copolymer comprises from about 10 to about 30 mol % of the comonomer, the comonomer is an acrylic or methacrylic comonomer, and the copolymer has a weight average molecular weight between about 10 kDa and about 100 kDa.

* * * * *